Aug. 14, 1945.  M. WATTER  2,382,357
METALLIC SKIN COVERED STRUCTURE
Filed March 6, 1943  5 Sheets-Sheet 1
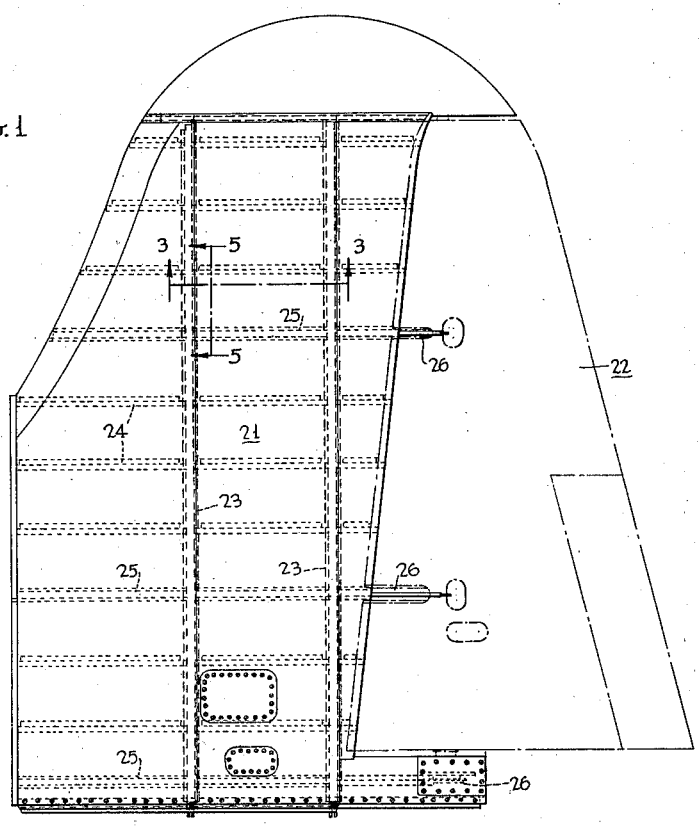
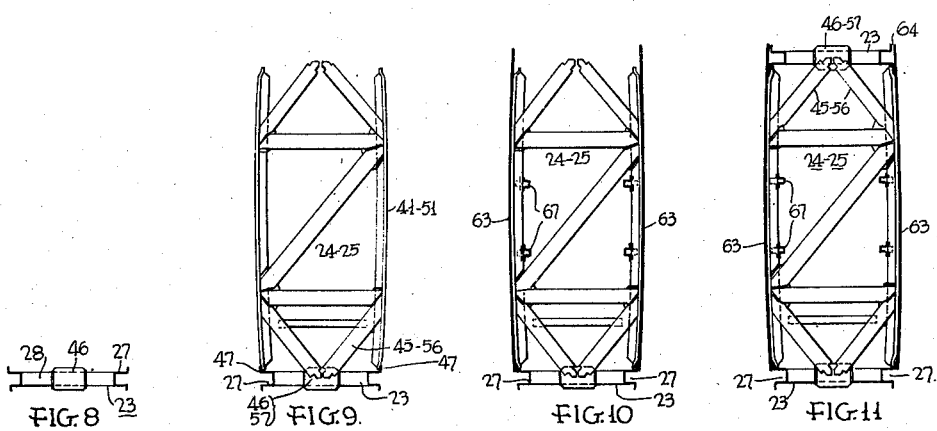
INVENTOR
Michael Watter.
BY John P. Tarbox
ATTORNEY

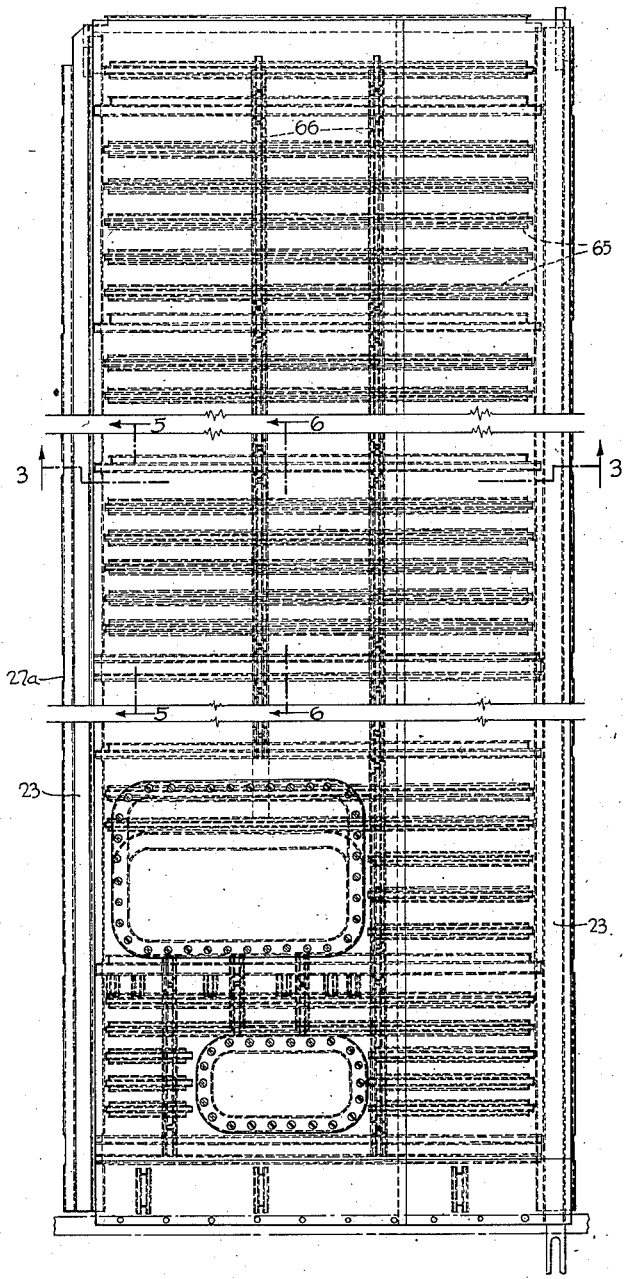

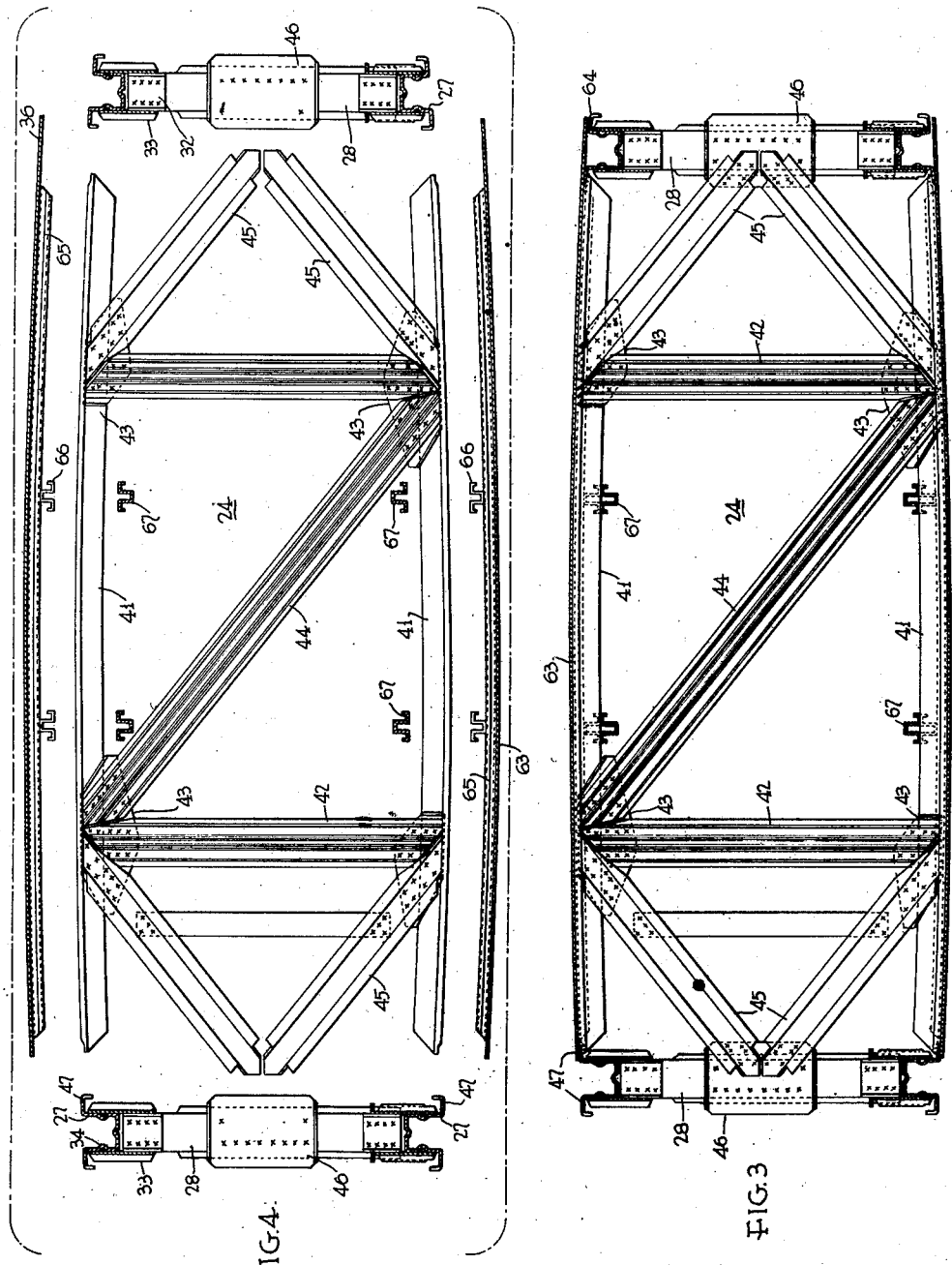

INVENTOR
Michael Watter.

BY John P. Tabry
ATTORNEY

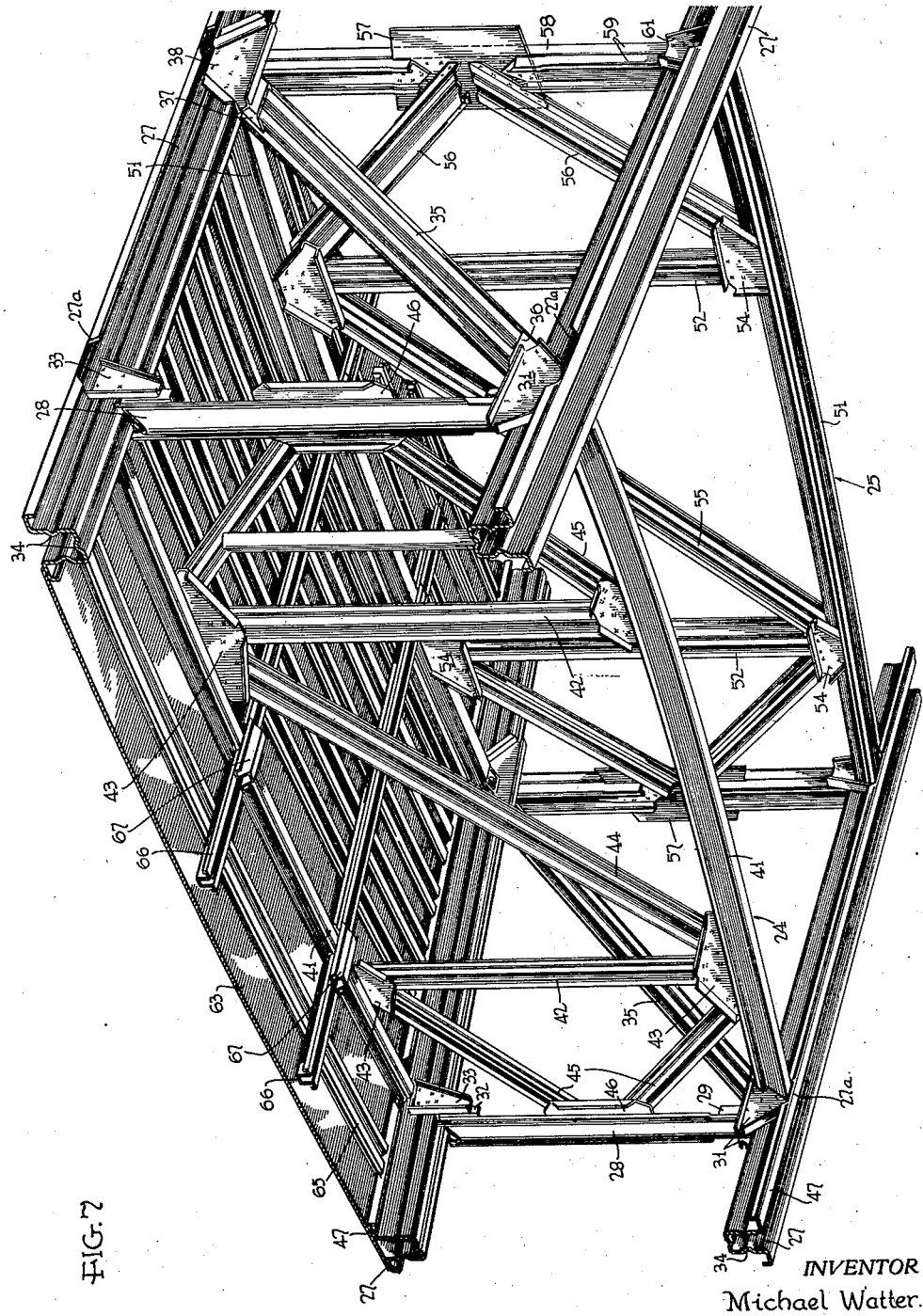

Patented Aug. 14, 1945

2,382,357

UNITED STATES PATENT OFFICE 2,382,357

METALLIC SKIN-COVERED STRUCTURE

Michael Watter, Philadelphia, Pa., assignor to Edward G. Budd Manufacturing Company, Philadelphia, Pa., a corporation of Pennsylvania Application March 6, 1943, Serial No. 478,231

8 Claims. (Cl. 189—34)

This invention relates generally to metallic structures such as are adapted for use in the construction of vehicles of various types including, for example, airplanes, railroad cars, automobiles, ships and like products of manufacture where a metallic surface or "skin" is mounted upon an inner, supporting, load-resisting or load-transmitting frame to form an integral part of the completed vehicle. One example of such a structure is found in an air reaction surface of an air transport vehicle, such as an airplane wing, a stabilizer, fin, or similar part, and for the purposes of the present disclosure the invention will be described in connection with such a member. Nevertheless, it will be apparent that the invention hereinafter disclosed embodies features which are equally well adapted for use in other functional capacities and in other forms of vehicles.

An object of this invention is to provide an integrated metallic structure of the type specified formed substantially entirely of metallic members joined together by welded joints, the construction and arrangement being such as to provide not only ready access to the parts for welding during manufacture and assembly, but also a finished product combining great strength with lightness of weight.

A further object is to provide an improved construction of reinforced skin blanket for metallic structures such, for example, as airfoils and the like.

A further object is to provide an airfoil structure designed not only to embody a lightweight skin blanket of great strength, but one which can be easily and rapidly assembled with the supporting framework by welding easily accessible parts.

A still further object is to provide a metallic structure such, for example, as an airfoil of the stressed skin type, constructed and arranged to have a skin blanket of great load carrying capacity.

These and other objects which will be apparent to those skilled in the art are accomplished by the present invention one embodiment which is illustrated in the accompanying drawings, in which:

Fig. 1 is a side elevation of a metallic structure constructed in accordance with one embodiment of this invention, showing the same embodied in an airplane fin as an example of structures to which the invention is adapted;

Fig. 2 is a similar view on an enlarged scale of the center panel of the airfoil shown in Fig. 1;

Fig. 3 is a sectional view on the line 3—3 of Fig. 1;

Fig. 4 is a view showing the manner of assembling the parts forming the center panel of Fig. 3;

Figure 5:
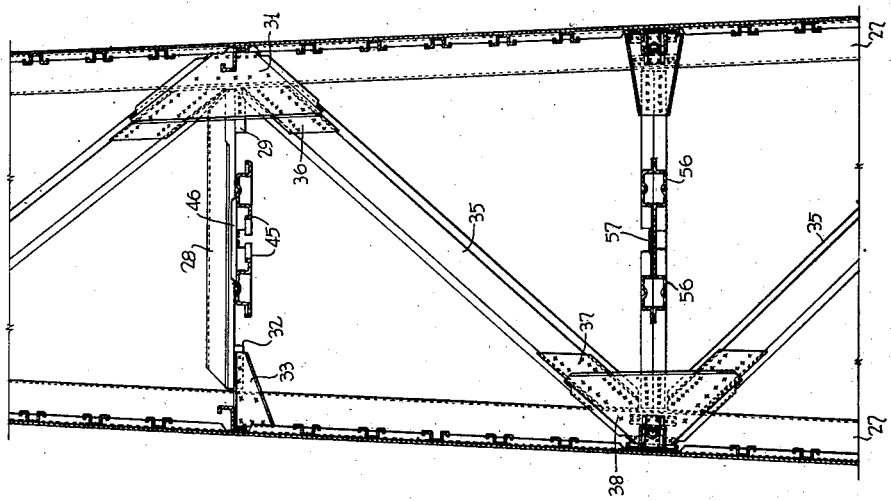
Figure 6:
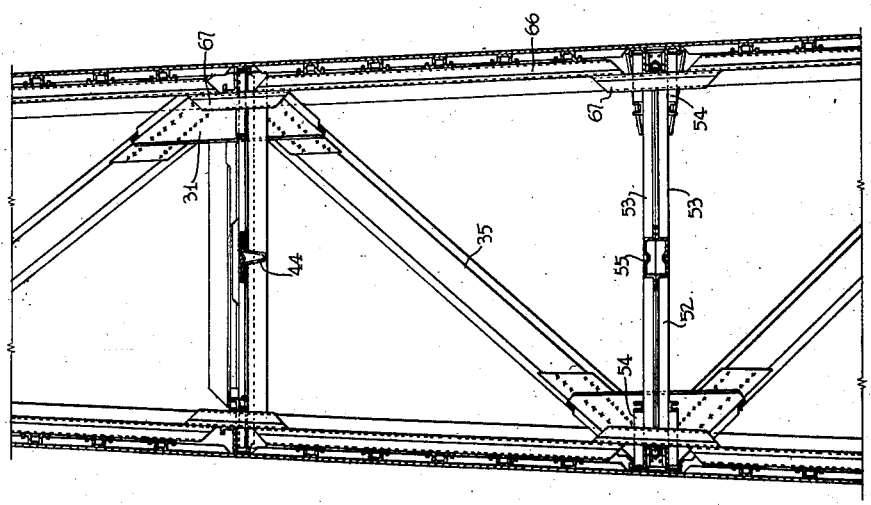

Figs. 5 and 6 are vertical sections on the lines 5—5 and 6—6, respectively, of Fig. 2;

Fig. 7 is a partial perspective view showing a reinforced skin blanket mounted on a portion of the supporting framework; and Figs. 8, 9, 10 and 11 are reduced scale, somewhat diagrammatic views showing the successive steps in assembling a metallic structure such as the airfoil shown in Figs. 1 to 7.

In the illustrated embodiment of this invention a supporting framework is formed of longitudinally extending spars and transverse spar-connecting ribs. A stressed metallic skin blanket is provided with a plurality of reinforcing members in the form of stringers of suitable cross section which are secured in spaced parallel positions to the inner face of the skin blanket, as by welding. The stringers are of such length as to extend across the surface of the skin blanket between the spars to which the blanket is directly secured as by welding. The strength of the skin blanket is additionally increased by longitudinally extending stiffeners of suitable cross section which are secured to and extend transversely across the stringers between the successive ribs of the supporting framework. Preferably the stiffeners are welded to the stringers. The adjacent ends of successive stiffeners on opposite sides of the ribs are connected by saddle members or the like which extend across and are secured to the ribs and are connected at each end to the adjacent stiffener members. The arrangement is such that the reinforced skin blanket can be formed as a unitary sub-assembly.

As illustrated, the present invention is shown in connection with an airfoil in the form of a vertical fin 21 having a rudder 22 hinged to the fin in any suitable manner. The structure comprises an inner, supporting framework and a stressed, reinforced skin blanket secured thereto. The inner framework is formed by a plurality of parallel, longitudinally extending spars 23 connected together by transversely extending ribs 24, together with several hinge ribs 25 which are of heavier construction than the remaining ribs 24, being called upon to support the rudder hinge frames 26 as generally indicated in Fig. 1.

Each spar 23 comprises chord members 27, of flanged channel or hat-shaped cross section connected by struts 28 at the point of intersection with the ribs 24. At one end, the strut 28 is welded to a channel shaped plate 29 the side flanges of which are in turn welded to triangular gusset plates 31 secured to the opposite side walls of the hat shaped chord 27. The other end of the strut 28 is connected to the opposite chord member 27 by an angle plate 32 welded to the strut, the plate 32 having flanges welded to the back of gusset plates 33 which are also welded to the side walls of the adjacent chord member 27. Each chord member 27 has longitudinally extending reinforcing grooves 34, one in the web and one in each side wall, and the gusset plates are welded to the side walls at each side of such groove. Each spar also includes diagonal struts 35 welded at one end to a connecting plate 36 which is in turn welded to gussets 31, see Figs. 5 and 7, and at opposite ends is welded to a connecting plate 37 which is in turn welded to a gusset 38 secured to a chord of one spar 27.

Where the struts 28 are located, adjacent spars are connected by transverse ribs 24, as shown in Figs. 3, 4 and 7. Each rib 24 includes chord members 41 of any suitable section, shown as of Z-shape. The chords 41 of each such rib are connected by transverse struts 42 welded to gusset plates 43 which are in turn welded to the adjacent chord 41. A diagonal strut 44 is connected to the diagonally opposite triangular gussets 43, and a pair of short diagonal struts 45 are provided at each end of the rib for connection to a gusset 46 mounted on the adjacent spar strut 28 intermediate the ends thereof. The reverse flange of each hat-shaped spar chord 27 is cut away at 27a, see Fig. 7, to accommodate the ends of the rib chord members 41 and the latter are welded to the outwardly extending flanges 47 of the spar chord 27.

As above pointed out, hinge ribs 25 are provided in place of the usual ribs 24 at certain predetermined positions, the hinge ribs being of stronger construction to resist the stresses imposed on them by the hinge frames 26 which are connected thereto for hingedly supporting the rudder 22, see Fig. 1. As shown in Figs. 5 and 7, each hinge rib includes chord members 51 which are preferably of flanged channel or hat-shaped cross section. The chords are connected by transverse struts 52, each strut being formed by a pair of flanged channel or hat-shaped sections 53, see Fig. 6, having their flanges welded together to form a unitary hollow strut, gusset plates 54 being welded to the opposite sides of each strut at each end thereof and to the side walls of the adjacent hat-shaped chord members 51. A transverse diagonal strut 55, of similar hat-shaped sections welded together, connects the opposite chord members 51, extending diagonally between gussets 54 to which it is welded. At its ends, each hinge rib has a pair of short diagonal trusses 56, each formed of a pair of hat-shaped sections welded together, connected at one end to a chord member 51 through the gusset plates 54, and at their other ends connected to a flat gusset plate 57 positioned between the hat-shaped sections. The gusset 57 at each end of each hinge rib is mounted on a spar strut 58 formed by a pair of hat-shaped sections 59 positioned back to back and connected at one end to the gusset plates 38 on the adjacent spar chord 27 and at the other end to gusset plates 61 connected to the opposite spar chord 27. The reverse flanges of the hat-shaped spar chords are also cut away as at 27a to accommodate the ends of the hinge rib chords 51 which are welded to the outwardly extending flanges 47 in a manner similar to the chords 41 of the typical ribs 24.

A reinforced skin blanket 63 is secured across the spars and ribs to form a surface such, for example, as the airfoil surface illustrated. The skin blanket of sheet metal such as stainless steel is spot welded at each edge to the flanges 47 of the spar chords 27. As illustrated in Figs. 3 and 7, the skin blanket is welded at one edge to the near flange 47 of the spar chord so as to leave the chord panel open. At the other edge, the skin blanket is welded to the near flange 47 but extends across the channel of the chord and across the opposite flange 47, forming therewith a slot 64 for receiving the edge of an adjacent section of skin blanket, or other element, to which it and the adjacent flange 47 can both be welded to form a unitary structure.

The skin blanket is provided with a plurality of transversely extending parallel stringers 65, also shown as hat-shaped, which are welded through their bottoms to the inner face of the skin sheet 63 and extend across the skin sheet between adjacent spar chords 27, the lengths of the stringers 65 being such that space is left on the skin blanket for direct engagement with and welding to the flanges 47 of the chord members 27. The stringers can be applied and secured to the skin sheet prior to the application of the latter to the spars. In addition to the stringers 65, the skin blanket is preferably reinforced by longitudinally extending stiffeners 66 which extend across the stringers 65 parallel to the blanket supporting spar chord members 27. As illustrated, each stiffener is of hat-shaped cross-section having the web thereof welded to the flanges of the hat-shaped stringers 65. The stiffeners are of such length as to extend, as shown, between, but not across, the various chord members 41 and 51, at that side of the ribs 24 and 25. The length of each stiffener is such as to leave space to receive the rib chords 41 and 51 therebetween so that the skin blanket 63 can be attached directly to these chord members. Saddles or cross-overs 67 of hat-shaped cross section, see Figs. 3, 6 and 7, are spot welded through their flanges to the flanges of the adjacent ends of successive stiffeners 66 and extend across and are spot welded to the rib chords 41 and 51. In effect, this forms a continuous stiffener from one end of the structure to the other.

It will be apparent that the skin blanket can have the stringers 65 and the longitudinal stiffeners 66 welded in place thereon before the skin blanket is applied to the supporting framework comprising the spars 23 and transverse ribs 24 and 25, thus providing a sub-assembly consisting of the reinforced skin blanket with spaces formed between the reinforcements to receive the chord members of the various spars and ribs to all of which the blanket is directly secured.

The successive steps followed in assembling a metallic structure embodying the present invention are indicated diagrammatically in Figs. 8 to 11. A spar comprising the chords 27, connecting struts and the like is positioned as shown in Fig. 8. The various ribs including both typical ribs 24 and hinge ribs 25 are secured at properly spaced intervals along the spar by welding their chord members to the flanges 47 of the chord members and by welding the end diagonals 45 and 56, as the case may be, to the gusset plates 46 or 57. This provides the partial assembly illustrated in part in Fig. 9.

The skin blanket sub-assemblies, each consisting of the skin sheet 63 with the stringers 65 and cross stiffeners 66 secured thereto, are formed by first stretching the metal skin sheet to smooth out any irregularities in the surface thereof. While so stressed the transverse stringers 65 are welded in position and the longitudinal stiffeners 66 are then welded across the stringers. The stringers and stiffeners are so arranged as to leave the necessary spaces for the skin sheet to be subsequently welded to the chord members of both the spars and the ribs. Each skin blanket sub-assembly is then placed in position with the chords of the spars and the chords of the ribs located in the spaces provided therefor at the ends of the stringers 65 and between the ends of successive longitudinal stiffeners 66. As shown, the skin blanket is positioned to leave open the channel of the chord section of this spar, the edge of the blanket being welded to the near flange thereof. Thereafter, the saddles 67 are welded to the stiffeners 66 and to the rib chords. Then, the next spar 23 is placed in position, as shown in Fig. 11, the near flange 47 of the chord member being welded to the skin sheet which extends across the channel of the chord section to form the slot 64 as above described.

It will be apparent that the stressed skin blanket, being directly mounted on and welded to all members of the inner framework, both longitudinal spars and transverse ribs, and being reinforced by transverse stringers secured to the inner face of the skin sheet, and being further reinforced by the longitudinal stiffeners extending across and welded to the stringers, which stiffeners are connected at the ends to each other and to the rib chords by the saddles 67, provides a metallic structure of great strength, despite a relatively light weight, in which the skin blanket itself is capable of withstanding relatively heavy loads and forms, in fact, an integral part of the completed structure.

The invention has been described only in connection with the central portion of the fin illustrated, that is, the portion disposed between the two spars 23. The same construction is also applicable to that portion of the structure lying at the left of the left spar 23 as viewed in Figure 1. The invention is also applicable to mono-spar and other constructions employing a plurality of spaced ribs, it being primarily directed to the relation of the reinforced skin blanket to the ribs. The stiffeners 67 provide an efficient and extremely effective means for not only the transfer of stresses between the ribs and the portions of the skin blanket intermediate adjacent ribs, but also for assisting the stringers 66 in maintaining the airfoil contour and for minimizing drumming or vibration of such intermediate blanket portions.

Although, for the purposes of the present disclosure, the invention has been described in connection with the center panel of an airplane fin, it will be apparent that the novel features herein disclosed are equally well adapted to metallic structures having other functions, other configurations, and employed for other purposes. It will also be apparent that the other panels of the illustrated fin, embody the same novel features as the center panel described. Also, that the specific details of the supporting framework are subject to considerable variation. Obviously the invention is neither limited to the particular article nor the details described, but can be variously modified and adapted within the scope of the appended claims.

What is claimed is:

1. A metallic stressed skin structure comprising a thin sheet metal skin having at one side thereof a plurality of spaced, generally parallel, reinforcing stringers, a plurality of skin-supporting ribs having chords adjacent said skin at said one side, said ribs being generally parallel to said stringers and there being a plurality of said stringers at each side of at least one of said ribs, stringer bridging stiffener members disposed above and crosswise of and secured to the tops of said stringers intermediate the ends thereof, there being at least one such bridging member between adjacent ribs, and terminating adjacent said adjacent ribs, said bridging stiffener members and said rib chords having walls disposed approximately in a common plane parallel to the skin, and means rigidly securing the top of each end of the bridging member to the top of a chord of the adjacent rib.

2. A metallic stressed skin structure comprising a thin sheet metal skin having at one side thereof a plurality of spaced, generally parallel reinforcing stringers, a plurality of skin-supporting ribs having chords adjacent said skin at said one side, said ribs being generally parallel to said stringers and there being a plurality of said stringers at each side of at least one of said ribs, stringer bridging stiffener members extending above and crosswise of the tops of said stringers between adjacent ribs and being rigidly secured to the bridged stringers, each end of a stiffener terminating adjacent a rib, there being at least one stiffener at one side of one rib substantially aligned with a stiffener at the other side of said one rib, said bridging stiffener members and said rib chords having walls disposed approximately in a common plane parallel to the skin, and rigid means extending through the one rib above a chord thereof rigidly connected with the tops of the adjacent ends of said aligned stringers.

3. A metallic stressed skin structure comprising a thin sheet metal skin having at one side thereof a plurality of spaced, generally parallel, reinforcing stringers, a plurality of skin-supporting ribs having chords adjacent said skin at said one side, said ribs being generally parallel to said stringers and there being a plurality of said stringers at each side of at least one of said ribs, stringer bridging stiffener members extending above and crosswise of the tops of said stringers between adjacent ribs and being rigidly secured to the tops of the bridged stringers, each end of a stiffener terminating adjacent a rib, there being at least one stiffener at one side of one rib substantially aligned with a stiffener at the other side of said one rib, said bridging stiffener members and said rib chords having walls disposed approximately in a common plane parallel to the skin, and rigid means extending through the one rib above a chord thereof rigidly connected with the tops of the adjacent ends of said aligned stiffeners and to the top of the chord of said one rib.

4. In a metallic skin covered structure having spaced truss-type rib elements and a thin gauge sheet metal skin spanning said rib elements and secured to the chord members of the rib elements at one side of the structure, the combination with said skin and rib elements of a group of spaced skin-reinforcing stringers parallel to said rib elements and secured to said skin between adjacent rib elements, a stringer reinforcing stiffener bridging and secured to the stringers of each group and terminating at its ends adjacent the chord members of adjacent rib elements, and a rigid saddle member interconnecting and securing the stiffener of one stringer group at one side of one rib element with the stiffener of the stringer group at the other side of said one rib element, said saddle member extending transversely through the rib element adjacent the chord member thereof to which the skin is secured, said stiffeners being of channel formation and having opposed side flanges and being secured through their bottoms to the skin-reinforcing stringers, and said saddle members being secured to said side flanges.

5. In a metallic skin covered structure having spaced truss-type rib elements and a thin gauge sheet metal skin spanning said rib elements and secured to the chord members of the rib elements at one side of the structure, the combination with said skin and rib elements of a group of spaced skin-reinforcing stringers parallel to said rib elements and secured to said skin between adjacent rib elements, a stringer reinforcing stiffener bridging and secured to the stringers of each group and terminating at its ends adjacent the chord members of adjacent rib elements, and a rigid saddle member interconnecting and securing the stiffener of one stringer group at one side of one rib element with the stiffener of the stringer group at the other side of said one rib element, said saddle member extending transversely through the rib element adjacent the chord member thereof to which the skin is secured, said stiffeners being of channel formation and having opposed side flanges and being secured through their bottoms to the skin reinforcing stringers, and said saddle members being of channel formation and having opposed side flanges abutting and secured to the corresponding side flanges of said stiffeners.

6. In a metallic skin covered structure having spaced truss-typed rib elements and a thin gauge sheet metal skin spanning said rib elements and secured to the chord members of the rib elements at one side of the structure, the combination with said skin and rib elements of a group of spaced skin-reinforcing stringers parallel to said rib elements and secured to said skin between adjacent rib elements, a stringer reinforcing stiffener bridging and secured to the stringers of each group and terminating at its ends adjacent the chord members of adjacent rib elements, and a rigid saddle member interconnecting and securing the stiffener of one stringer group at one side of one rib element with the stiffener of the stringer group at the other side of said one rib element, said saddle member extending transversely through the rib element adjacent the chord member thereof to which the skin is secured, said stiffeners being of channel formation and having opposed side flanges and being secured through their bottoms to the skin reinforcing stringers, and said saddle members being of channel formation and having opposed side flanges abutting and secured to the corresponding side flanges of said stiffeners and to said rib chord member.

7. In a metallic skin covered structure having spaced truss-type rib elements and a thin gauge sheet metal skin spanning said rib elements and secured to the chord members of the rib elements at one side of the structure, the combination with said skin and rib elements of a group of spaced skin-reinforcing stringers parallel to said rib elements and secured to said skin between adjacent rib elements, a stringer reinforcing stiffener bridging and secured to the stringers of each group and terminating at its ends adjacent the chord members of adjacent rib elements, and a rigid saddle member interconnecting and securing the stiffener of one stringer group at one side of one rib element with the stiffener of the stringer group at the other side of said one rib element, said saddle member extending transversely through the rib element adjacent the chord member thereof to which the skin is secured, said stringers, stiffeners and saddle members each being of channel formation having opposed side flanges, said stringers being secured through their channel bottoms to said skin, said stiffeners being secured through their bottoms to the side flanges of said stringers, and said saddle members being secured through their side flanges to the side flanges of said stiffeners.

8. In a metallic skin covered structure having spaced truss-type rib elements and a thin gauge sheet metal skin spanning said rib elements and secured to the chord members of the rib elements at one side of the structure, the combination with said skin and rib elements of a group of spaced skin-reinforcing stringers parallel to said rib elements and secured to said skin between adjacent rib elements, a stringer reinforcing stiffener bridging and secured to the stringers of each group and terminating at its ends adjacent the chord members of adjacent rib elements, and a rigid saddle member interconnecting and securing the stiffener of one stringer group at one side of one rib element with the stiffener of the stringer group at the other side of said one rib element, said saddle member extending transversely through the rib element adjacent the chord member thereof to which the skin is secured, said stringers, stiffeners and saddle members each being of channel formation having opposed side flanges, said stringers being secured through their channel bottoms to said skin, said stiffeners being secured through their bottoms to the side flanges of said stringers, and said saddle members being secured through their side flanges to the side flanges of said stiffeners and through their side flanges to said rib chord member.

MICHAEL WATTER.